United States Patent
Kawaguchi

[11] Patent Number: 5,246,771
[45] Date of Patent: Sep. 21, 1993

[54] ADHESIVE TAPE FOR PREVENTING IMPLOSION AND REMOVING ELECTROSTATIC CHARGE

[75] Inventor: Takeo Kawaguchi, Tokyo, Japan

[73] Assignee: Teraoka Seisakusho Co., Ltd., Tokyo, Japan

[21] Appl. No.: 931,500

[22] Filed: Aug. 21, 1992

Related U.S. Application Data

[63] Continuation of Ser. No. 338,035, Apr. 14, 1989, abandoned.

[30] Foreign Application Priority Data

Apr. 18, 1988 [JP] Japan ................... 63-93475

[51] Int. Cl.$^5$ ............................................. C09J 7/02
[52] U.S. Cl. .................... 428/261; 428/344; 428/354; 428/356
[58] Field of Search ............... 428/343, 344, 354, 356, 428/261

[56] References Cited

U.S. PATENT DOCUMENTS

| | | | |
|---|---|---|---|
| 4,258,100 | 3/1981 | Fujitani | 428/356 |
| 4,546,037 | 10/1985 | King | 428/356 |
| 4,548,862 | 10/1985 | Hartman | 428/356 |
| 4,569,877 | 2/1986 | Tollefson | 428/344 |
| 4,735,847 | 4/1988 | Fujiwara | 428/356 |

FOREIGN PATENT DOCUMENTS

| | | | |
|---|---|---|---|
| 47-13860 | 7/1972 | Japan . | |
| 56-107456 | 8/1981 | Japan . | |
| 58-34881 | 3/1983 | Japan . | |
| 0215088 | 10/1985 | Japan | 428/355 |
| 63-43246 | 2/1988 | Japan . | |
| 7100273 | 12/1971 | Netherlands . | |

Primary Examiner—Jenna L. Davis
Attorney, Agent, or Firm—Burns, Doane, Swecker & Mathis

[57] ABSTRACT

A circuit for removing electrostatic charges from the surface of a cathode ray tube is formed by adding electrically conductive particles to an adhesive used to prevent an implosion of the tube and located between a metal clamping band and the surface of the tube. The electrically conductive particles have a particular particle size distribution and are dispersed in a particular amount.

12 Claims, 1 Drawing Sheet

ADHESIVE TAPE FOR PREVENTING IMPLOSION AND REMOVING ELECTROSTATIC CHARGE

This application is a continuation of application Ser. No. 07/338,035, filed Apr. 14, 1989, now abandoned.

BACKGROUND OF THE INVENTION

Field of the Invention

The present invention relates to an adhesive tape used together with a clamping metal band to prevent an implosion of a cathode ray tube and to remove an electrostatic charge from the cathode ray tube. The present invention also relates to a process for reinforcing a cathode ray tube with the adhesive tape and the clamping metal band against an implosion thereof and forming a circuit of the above adhesive tape for removing an electrostatic charge from the cathode ray tube.

Description of the Related Art

A cathode ray tube (hereinafter CRT) or a Braun tube used for television equipment or display is applied with a very high electrical voltage for forming an image, and this causes a generation and accumulation of electrostatic charges at a peripheral portion of the CRT. The electrostatic charges not only attract dust, etc., but also are dangerous to viewers if the CRT is touched by hand. Further, accumulated electrostatic charges may degrade the quality of the image and cause interference of an image.

Various attempts have been made to try to remove the electrostatic charges, due to the disadvantages thereof described above, and in general, a graphite or electrically conductive coating is applied to the periphery of the CRT by which electrostatical charges are collected and grounded through a clamping band and to an earth circuit arranged in a cabinet etc., since restructuring of the CRT or television equipment, etc., is limited.

The clamping band is used to prevent an implosion of the CRT, in which a high vacuum is established, due to an external impact thereon particularly from the front side, and is usually made of a metal, or a high tension material. To effectively transmit the clamping pressure of the clamping band, to the CRT, and to prevent a direct contact of the clamping band with a glass surface of the CRT, which may cause defects such as scratching of the glass surface, an adhesive tape composed of a polymer and glass cloth which is highly insulative, as disclosed in Japanese Examined Patent Publication No. 63-24291, must be adhered between the glass and the clamping band, and as a result, the formation of a circuit for the removal of electrostatic charges mentioned above must be effected by a means different from the above anti-implosion means.

Other means for removing of electrostatic charges include adhering single-sided or double-sided electrically conductive adhesive tapes containing an electrically conductive substrate of copper or aluminum foil or cloth and electrically conductive fine powders of copper, etc., in an adhesive, which have a resistance of several ohms under a pressure of several tens of kg/cm², around only four corners of a CRT, so that the clamping band and the glass are electrically connected via the electrically conductive adhesive tapes. This method, however, is not reliable, since the effectiveness thereof depends on the skill of the maker, and this method sometimes results in a complete peeling off of the electrically conductive tapes whereby the electrostatical charge removal circuit becomes in operable, or causes short circuits and serious failures in the cabinet due to an adhesion thereof of the peeled off electrically conductive tapes. Furthermore, this requires great care at the production line, and thus is disadvantageous from the viewpoint of a high productivity.

Japanese Unexamined Patent Publication (Kokai) No. 63-43246 published on Feb. 24, 1988, proposed a method in which an electrically conductive adhesive tape as mentioned above was placed between a tension band and a glass surface of a CRT. This method, however, does not consider the effect of implosion prevention by the tension band, particularly the necessity of adhesion of the band to the CRT and the electrically conductive tape causes problems similar to those described above. Accordingly, this proposal does not provide a practical method of preventing an implosion of and a removal of electrostatical charges from the CRT.

SUMMARY OF THE INVENTION

The main object of the present invention is to solve the above problems and to provide a practical means for preventing an implosion of and removing electrostatic charges from a CRT.

The above and other objects, features and advantages of the present invention are obtained by providing an adhesive tape for preventing an implosion of a CRT, the tape comprising a layer of an adhesive, a flexible substrate embedded in the adhesion layer and electrically conductive particles dispersed in the adhesive layer, the electrically conducting particles having a particle size of from 0.1 μm to 300 μm and a mode particle size of from 25 μm to 300 μm. The electrically conductive particles are contained in a reduced dispersion amount of 1 to $10^5$ cm$^{-2}$, this reduced dispersion amount being represented by the following formula:

$$D_r = \frac{W}{V_m \cdot \rho \cdot 10^4}$$

where $D_r$ stands for the reduced dispersion amount (cm$^{-2}$), W stands for a weight of electrically conductive particles used per unit area (g/m²), $V_m$ stands for a volume of an electrically conductive particle at the mode (cm³), and ρ stands for a density of the electrically conductive particles (g/cm³). The adhesive tape has an electrical resistance before use between the two major surfaces thereof of more than 1 MΩ.

This adhesive tape allows the use of a clamping band and an adhesive tape used with the clamping band for preventing an implosion of a CRT and removing electrostatic charges, by the same steps as used for a conventional clamping process.

There is also provided a process for reinforcing a CRT against an implosion and for removing electrostatic charges with a clamping band and an adhesive tape, this process comprising the steps of: preparing a CRT having a maximum peripheral portion and covered with a transparent electrically conductive film; applying an adhesive as described above completely or partly on or near the maximum peripheral portion of the CRT; clamping the CRT with a metal clamping band around the maximum peripheral portion of the CRT and on top of the adhesive tape, by heating the metal clamping band to a temperature of not less than 120° C. and arranging the metal clamping band around the adhesive tape, and then allowing the metal clamping band to cool so that the maximum peripheral portion of the tube with the adhesive tape is clamped by the metal clamping band, wherein the adhesive tape after the clamping thereof has an electrical resistance between the two major surfaces thereof of less than 1 MΩ so that an electrical circuit composed of the transparent electrically conductive film, the metal clamping band, and the adhesive tape, which is to be connected to the ground, is formed.

DESCRIPTION OF THE PREFERRED EMBODIMENTS

Figure 1:
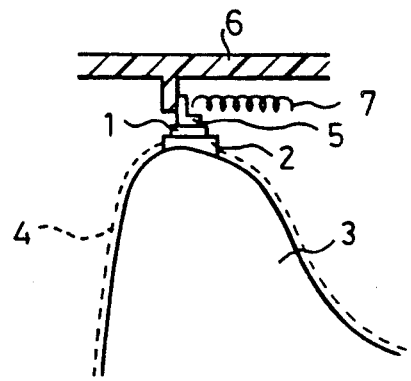
FIG. 1 is a sectional view of a CRT reinforced with a clamping band and provided with a circuit for removing electrostatic charges.

The clamping band is designed to generate a high clamping force by using a high tension metal band and heating and cooling i.e., expanding and shrinking same, to prevent an implosion of a CRT in a vacuum state. Although the clamping force depends on the design of the CRT or the structure of the clamping band, this force is usually more than 30 kg/cm² around the four corners of and 1 to 10 kg/cm² at the flat peripheral portions, of the CRT. A higher pressure may be applied or generated at protruding portions or steps, such as mold match lines. An adhesive layer is inserted between the clamping band and the CRT, by winding the adhesive tape around the CRT and arranging a clamping band on top of the adhesive tape. An effective adhesive tape comprises an adhesive layer and a substrate contained in the adhesive layer, optionally with a filler. The inventors et al found that the adhesive tape must not be broken when clamped under a high pressure, as mentioned above, and an effective adhesive layer must be present between the clamping band and the CRT, to prevent an implosion of the CRT by the clamping band. Accordingly, the adhesive tape must have a special structure.

When the adhesive tape is subjected to the clamping pressure, the adhesive, which is an organic component, is fused or softened, and thus made flowable, by the heat of the clamping band. When a substrate is composed of a glass cloth or the like, the adhesive tape is finally held by the substrate and a cohesion of the adhesive. In this case, the limitation of the flowability of the adhesive is defined by a thickness of the glass cloth or a diameter of glass fibers around the corners of the CRT, whereat a particularly high pressure is applied. When the substrate is a polyester film or the like, the adhesive tape is finally held by a cohesion of the film and adhesive and the limitation of the flowability of the adhesive is defined by a particle size of a filler or a slip-preventing component contained in the adhesion layer. The inventors carefully studied the above phenomena, and thus added an inorganic electrically-conductive particles to the adhesive layer, whereby the electrical resistance between the clamping band and the glass CRT is reduced to a level capable of removing electrostatic charges, i.e., less than 1 MΩ, preferably less than $10^4$ Ω, more preferably less then 10 Ω, when clamped. A conventional adhesive tape used with a clamping band has an inherent volume electric resistance of usually more than $10^9$ Ω-cm, typically more than $10^{13}$ Ω-cm, which is a heavy insulator. The adhesive tape according to the present invention also must have a high electric resistance before clamping, i.e., more than 1 MΩ, preferably more than $10^3$ MΩ, between the two major surfaces of the adhesive tape. This high electric resistance of the adhesive is necessary to prevent short circuits in television equipment, etc., caused by a peeling off and adhesion of a portion of the adhesive when clamped. At the same time, the adhesive tape according to the present invention must have an electric resistance of less than 1 MΩ, preferably less than $10^4$ Ω, more preferably less than 10 Ω, between the two major surfaces of the adhesive tape, after clamped under a pressure of, for example, 10 to 30 kgf/cm². Furthermore, the adhesive tape according to the present invention must retain the ability to prevent an implosion of the CRT when clamped with a clamping band.

Note that conventional electrically conductive tapes have an electrical conductivity of less than several hundred milli ohms before use or after used without pressing, and therefore are not suitable for the purposes of the present invention.

The above requirements of the present invention are met by adding electrically conductive particles having a specific particle size to an adhesive layer having a substrate therein, in a specific dispersion amount. The electrically conductive particles preferably have a particle size of 0.1 μm to 300 μm and a mode particle size of 25 μm to 300 μm, are contained in a reduced dispersion amount of 1 to $10^5$ cm$^{-2}$. This reduced dispersion amount is represented by the following formula:

$$D_r = \frac{W}{V_m \cdot \rho \cdot 10^4}$$

where $D_r$ stands for the reduced dispersion amount (cm$^{-2}$), W stands for a weight of electrically conductive particles used per unit area (g/m²), $V_m$ stands for a volume of an electrically conductive particle at the mode (cm³), and ρ stands for a density of the electrically conductive particles (g/cm³). The term "mode" is used to indicate the particle size present in the maximum amount among the electrically conductive particles. Preferably, the adhesive tape according to the present invention includes at least one electrically insulative organic layer having an electric resistance of more than $10^9$ Ω-cm, to ensure the high electric resistance of the tape before use or when peeled off.

By applying the above adhesive tape completely or partly around or near a maximum periphery portion of a CRT, followed by clamping, the heat and pressure of a clamping band cause a flow of flowable components in the adhesive tape, and the electrically conductive particles are densified directly under the clamping band since the flowability of the particles is reduced due to contact with or a close approach to each other, the clamping band, and the surface of the CRT, whereby the electric resistance of the adhesive tape is reduce to less than 1 MΩ, preferably less than $10^4$ Ω, more preferably less than 10 Ω, between the two major surfaces thereof. This is the basis of the present invention.

The present invention is described with reference to the drawings.

FIG. 1 illustrates a CRT provided with an implosion prevention means. In the figure, 1 denotes a clamping band, 2 an adhesive tape according to the present invention, 3 a CRT, 4 a transparent electrically conductive film, 5 a lug, 6 a cabinet, and 7 a wire to the ground.

Figure 2:
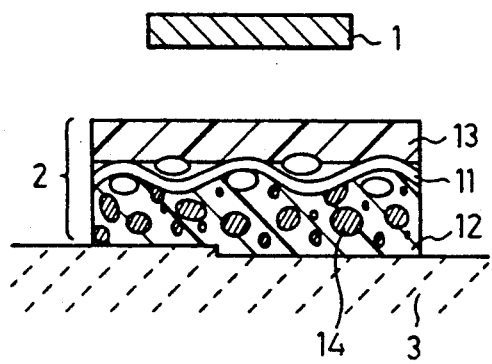
FIGS. 2 and 3 are sectional views of adhesive tapes before clamping.
Figure 3:
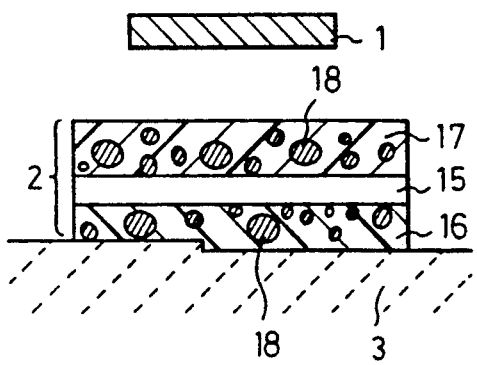

FIGS. 2 and 3 illustrate preferable adhesive tapes according to the present invention, before clamping. In FIG. 2, 1 denotes a clamping band, 2 an adhesive tape, 3 a CRT, 11 a substrate of a fabric, 12 a first adhesive layer, 13 a second adhesive layer, and 14 electrically conductive particles. This structure of the adhesive tape comprising the first and second adhesive layers 12 and 13 and the fabric substrate 11 therebetween provides an effective implosion prevention effect in cooperation with the clamping band, because the substrate 11 keeps the tape when clamped with the clamping metal band 1 and the adhesive layers 12 and 13 remain and are adhered to the clamping band 1 and the CRT 3 respectively.

The fabric substrate 11 may be of, for example, glass cloth, rayon (polyester) cloth, cotton cloth, etc. or a union or mixed cloth thereof. The thickness of the fabric is from 50 $\mu$m to 800 $\mu$m, preferably from 100 $\mu$m to 400 $\mu$m depending on the design of the CRT and the shape of the clamping band. If the thickness of the fabric is less than 50 $\mu$m, the substrate 11 is cut when clamped and the implosion prevention effect is lost. If the thickness of the fabric is more than 800 $\mu$m, large electrically conductive particles must be used to obtain a sufficient electrical conductivety, which may damage the surface of the CRT, or a large amount of small electrically conductive particles must be used, which is impractical from the veiwpoint of cost.

The first adhesive layer 12 is a pressure sensitive adhesive which effectively causes an initial adhesion to the CRT 3. The pressure sensitive adhesives are known, and typically, are a synthetic resin system containing acrylate copolymer as the main component or a natural rubber system having a tackfier resin, etc., incorporated thereon. The first adhesive layer 12 is preferably applied in an amount or thickness of 25 g/m$^2$ to 500 g/m$^2$, more preferably 50 g/m$^2$ to 200 g/m$^2$. If this amount or thickness is less than 25 g/m$^2$, the first adhesive layer 12 is streaky when applied and has a poor initial adhesion to the glass. If the amount or thickness is more than 500 g/m$^2$, a large amount of the adhesive is forced out when the tape is clamped, resulting in a poor aesthetic appearance, and the adhesive has an excess flowability which can allow movement of the tape after cooling.

The second adhesive layer 13 is preferably an electrically insulative organic adhesive having an inherent electric resistance of more than 10$^9$ $\Omega$-cm. If the resistance is less than 10$^9$ $\Omega$-cm, the adhesive tape easily becomes electrically conductive. Accordingly, the electrically conductive particles 14 should not preferably be incorporated in this second adhesive layer 13. This high insulation of the second adhesive layer 13 ensures that the adhesive tape 2 has a sufficient electric resistance even if the electrically conductive particles 14 are incorporated in the adhesive tape 2, although the specifically limited amount of the electrically conductive particles used according to the present invention provides the adhesive tape 2 with the necessary insulation before clamped. The second adhesive layer 13 is preferably a thermoset or themoplastic resin type adhesive, i,e., not a pressure sensitive adhesive. This is because, if the second adhesive layer 13 is a pressure sensitive type, dust may be deposited and adhered on exposed areas of the second adhesive layer 13 after clamped with the clamping band 1, which leads to a poor aesthetic appearance of the CRT. The thermoset resin type adhesives are known and include, for example, epoxy or polyester resins intermediately cured by a cross-linking agent. The thermoplastic resin type adhesives are also known and include, for example, polythylene or ethylene-vinyl acetate copolymer. The second adhesive type 13 is preferably applied in an amount or thickness of 10 g/m$^2$. If this amount or thickness is less than 10 g/m$^2$, the insulation effect is decreased, and an amount g/m$^2$, the insulation effect is decreased, and an amount or thickness of more than 200 g/m$^2$ may disadvantageously prevent an increase of the electric resistance of the tape 2 after clamping, or disadvantageously allow movement of the tape after clamping and cooling.

As mentioned above, the electrically conductive particles 14 are preferably incorporated only in the first adhesive layer 12. The amount of electrically conductive particles 14 is defined as stated above according to the present invention. This amount allows a high electric resistance before clamping and a required electrical conductivity after clamping.

The electrically conductive particles 14 may be metal powders selected from powders of iron, copper, aluminum, nickel, silver and alloys thereof, and preferably have a particle size of 0.1 $\mu$m to 300 $\mu$m, more preferably 25 $\mu$m to 300 $\mu$m, and a mode particle size of 25 $\mu$m to 300 $\mu$m. If the mode particle size is less than 25 $\mu$m, a large amount of the particles 14 must be incorporated to attain the desired effect, which disadvantageously increases the cost and degrades the adhesive characteristics. If the mode particle size is more than 300 $\mu$m, larger particles receive a local clamping force from the clamping band, whereby the surface of the cathode ray tube may be damaged or the implosion prevention effect reduced, or the adhesive tape will have a lower electric resistance before use, which may cause short circuits and faults due to accidental contact of the particles separated from the tape with circuits of the body.

The electrically conductive particles 14 are preferably contained in the adhesive tape in a reduced dispersion amount, as defined above, of 1 cm$^{-2}$ to 10$^5$ cm$^{-2}$. The reduced dispersion amount must be more than 1 cm$^{-2}$ to obtain the desired effect, but an amount of more than 10$^5$ cm$^{-2}$ results in increased costs and decreased characteristics. Preferably the reduced dispersion amount is 1 cm$^{-2}$ to 5$\times$10$^3$ cm$^{-2}$, more preferably 1 cm$^{-2}$ to 2$\times$10$^3$ cm$^{-2}$.

FIG. 2 illustrates an adhesive tape 2 comprising a substrate 15 in the form of a film or sheet together with first and second adhesive layers 16 and 17 containing electrically conductive particles 18.

The substrate 15 in the form of a film (or sheet) is preferably an organic film having a high inherent electric resistance of more than 10$^9$ $\Omega$-cm and may be of polyester. The film substrate 15 preferably has a thickness of 50 $\mu$m to 150 $\mu$m, more preferably 75 $\mu$m to 135 $\mu$m. If the thickness of the film substrate 15 is less than 50 $\mu$m, the film is easily fused and cut by the heat or pressure of the clamping band, and thus the insufficient implosion prevention effect is reduced or lost. If the thickness of the film is more than 150 $\mu$m, the adhesive tape 2 may not fully adhere to the CRT when taping and may make the formation of an electric circuit difficult.

In the adhesive tape 2, as in FIG. 3, since the substrate 15 can be highly insulative, electrically conductive particles 18 may be dispersed not only in the first adhesive layer 15 but also in the second adhesive layer 16, although the particles 18 may be dispersed only in one of these two adhesive layers 15 and 16. The total amount of the dispersed electrically conductive particles 18 must be the same as that in the tape, as shown in FIG. 2, i.e., the reduced dispersion amount is preferably from 1 cm$^{-2}$ to 10$^5$ cm$^{-2}$.

The first adhesive layer 16 is preferably a pressure sensitive adhesive, as described in connection with the first adhesive layer 12 in FIG. 2, and the second adhesive layer 17 is preferably a thermoset or thermoplastic resin type adhesive, as described in connection with the second adhesive layer 13 in FIG. 3. Note, as mentioned above, the electrically conductive particles 18 may be dispersed not only in the layer 16 but also in the layer 17 in this tape of FIG. 3.

The adhesive tape according to the present invention may be manufactured as follows: A cloth or film is dipped in a predetermined solution containing a precalculated amount of electrically conductive particles dispersed therein, followed by drying and coating or impregnating the dipped and dried tape with an adhesive by using a roll coater. The resultant tape is then backed with paper and wound onto a roll. Alternatively, a precalculated amount of electrically conductive particles is dispersed into at least one component of an adhesive and a substrate is coated or impregnated with the adhesive, backed with paper, and wound onto a roll. Furthermore, before winding or during slitting, the electrically conductive particles can be dispersed on a surface of the adhesive tape by a quantitative distributor, followed by embedding the particles into the adhesive tape with a pressure roller.

Figure 4:
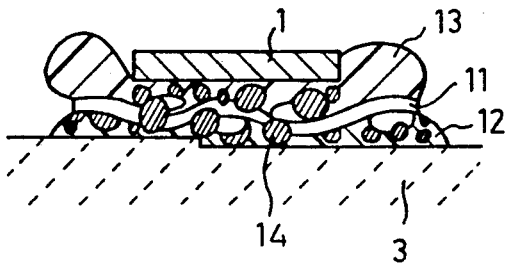
FIG. 4 is a sectional view of an adhesive tape after clamping.

FIG. 4 illustrates the adhesive tape 2 according to the present invention after the CRT 3 is clamped with the clamping band 1. After winding and applying an adhesive tape 2 according to the present invention completely or partially around or near the maximum peripheral portion of the CRT 3, the clamping band 1 made of steel or stainless steel is heated to a temperature of more than 120° C. and then placed on top of the adhesive tape 2. The band 1 is then allowed to cool. During these processes, the adhesives 12 and 13 are fused or softened and thus made flowable, whereby the electrically conductive particles 14 penetrate into the adhesive 13 and are made into contact with or close to each other, as shown in FIG. 4, so that the electric resistance of the tape 2 between the two major surfaces is reduced to less than 1 MΩ. As a result, an electrical connection between the transparent electrically-conductive film 4, the clamped tape 2, and the metal clamping band 1 is formed. The metal clamping band 1 is connected to the lug 5 which is connected to the ground through the wire 7, and thus a flow or removal of electrostatic charges through the circuit is obtained. The electric resistance of less than 1 MΩ, preferably less than 10$^4$ Ω, most preferably less than 10 Ω, of the clamped adhesive tape allows the removal of electrostatic charges. Although the clamping force applied by the metal clamping band 1 depends on the design of the CRT or the structure of the metal clamping band 1, this clamping force is usually more than 30 kgf/cm$^2$ near the four corners of the CRT and 1 to 10 kgf/cm$^2$ on the flat side portions thereof, which is sufficient to ensure a reduced electric resistance of the tape.

The thus obtained CRT is not only effectively reinforced by the clamping band to prevent an implosion thereof, but also is provided with an effective circuit for a removal of electrostatic charges, and therefore, the CRT is safe, and furthermore, requires no change in the manufacturing steps, after the steps described above. This is particularly advantageous to industry.

The invention is now described in detail with reference to examples thereof, which in no way limit the scope of the present invention.

EXAMPLE 1

A plain glass cloth composed of 30 weft fibers per 25 mm (yarn count: #150) and 25 warp fiber per 25 mm (yarn count: #75), and having a thickness of 0.18 mm, was treated with an aminosilane. Ethylene-acrylic acid copolymer (MI=1, content of acrylic acid 8%) having a softening point of 85° C., as a thermoplastic adhesive, was fused at 350° C. and extruded and laminated on one side of the treated glass cloth at a basis weight (amount applied) of 60 g/m$^2$. An adhesive formulation having butyl acrylate (solid content 33%) was added and mixed with iron powders having a density of 7.86 g/cm$^2$, an electric resistance of 9.8×10$^{-8}$ Ω-m, a particle size distribution of from 15 μm to 135 μm, and a mode particle size of 105 μm (145 mesh) in an amount of 0.8% by volume based on the adhesive formulation. This mixture was coated on the other side of the glass cloth at a basis weight of 115 g/m$^2$ followed by drying, and thus an adhesive tape containing iron powders in a reduced dispersion amount of the iron powders of 386.6 cm$^{-2}$ was obtained.

The characteristics of this tape are shown in Table 1.

This film was cut to a width of 45 mm, and the resultant tape was wound and adhered around the maximum peripheral portion of a 29 inch CRT for color TV. An iron band, having an inner periphery length corresponding to 99.5% of the maximum periphery of the tube, was placed, after heating to 500° C., on top of the tape, and the electric resistance of the tape between the two major surfaces and the implosion prevention effect of the CRT were measured.

The results are shown in Table 1.

EXAMPLE 2

Nickel powders having a mode particle size of 75 μm (about 200 mesh), a particle size distribution of 1 μm to 95 μm, a density of 8.85 g/cm$^3$, and an electric resistance of 7.24×10$^{-8}$ Ω-m were applied with vinylidene chloride on both surfaces of a polyester film having a thickness of 0.75 mm. The basis weight of the vinylidene chloride with the nickel powder was about 50 g/m$^2$. This pretreated film contained nickel powders in a reduced dispersion amount of the nickel powders of 1279.2 cm$^{-2}$.

A rubber-based adhesive comprising natural rubber, an adhesivity-providing resin, and a filler was applied on both surfaces of the pretreated polyester film by dipping. After drying, the basis weight of the rubber-based adhesive applied on to the respective surfaces of the film was 70 g/m$^2$. The treated film was backed with a release paper and wound onto a roll.

The film was cut into tapes having a width of 45 mm, and applied to the CRT, as in Example 1, in the same manner as in Example 1.

The results are shown in Table 1, and showed the required effects were fully obtained.

EXAMPLE 3

A leno glass cloth composed of 16 weft fibers per 25 mm (yarn count: #150×2) and 16 warp fibers per 25 mm (yarn count: #75) and having a thickness of 0.24 mm was treated with vinyl chloride, and an ethylene-vinyl acetate copolymer resin (content of vinyl acetate: 10 wt %) having a softening point of 95° C. was fused at 400° C. and extruded and laminated on one side of the glass cloth at a basis weight of 65 g/m².

A rubber-based adhesive comprising natural rubber and an adhesivity-providing resin was applied on the other side of the glass cloth by a calender roll to a basis weight of 160 g/m². On this side of the glass cloth, aluminum powders having a particle size distribution of 50 μm to 350 μm, a mode particle size of 210 μm, a density of 2.69 g/cm³, and an electric resistance of $2.75 \times 10^{-8}$ Ω-m were dispersed in an amount of 25 g/m² by a quantitative distributor, and the aluminum powders were embedded in the adhesive by a pressure roller at a pressure of less than 5 kg/cm². The resultant tape was backed with paper and wound on roll. The tape had a reduced dispersion amount of the aluminum powders of 191.8 cm$^{-2}$.

The tape was cut to a width of 45 mm, and the same tests as in Example 1 were carried out.

The results are shown in Table 1.

EXAMPLE 4

A glass cloth as used in Example 1 was treated in the same manner as in Example 1 to coat ethylene-acrylic acid copolymer resin on one side thereof in an amount of 50 g/m². An adhesive formation used in Example 1 (solid content 33%) was added and mixed with copper powders having a particle size distribution of 1.5 μm to 300 μm, a mode particle size of 290 μm, a density of 8.85 g/cm³, and an electric resistance of $1.72 \times 10^{-8}$ Ω-m, in an amount of 0.1% by volume, and the resultant adhesive was coated on the other side of the glass cloth at a basis weight of 85 g/m², and dried. The resultant adhesive tape had a reduced dispersion amount of copper powders of 1.97 cm$^{-2}$.

The same tests as in Example 1 were carried out.
The results are shown in Table 1.

EXAMPLE 5

A rubber-based adhesive formulation comprising natural rubber, an adhesivity-providing resin, and a filler was applied on one side of a polyester film having a thickness of 0.75 mm, and dried. Then 100 parts by weight of an epoxy compound containing dicyandiamide (bisphenol A type: epoxy value 285) was added to and mixed with 0.9 parts by weight of silver powders having a particle size distribution of 100 μm to 200 μm, a mode particle size of 150 μm, a density of 10.5 g/cm³, and an electric resistance of $1.62 \times 10^{-8}$ Ω-m. The resultant adhesive was coated over the top side of the film by a hot melt coater heated at 75° C., to a basis weight of 25 g/m². The coated film was backed with a release paper and wound on a roll, and an adhesive tape having a reduced dispersion amount of silver powders of 1.21 cm$^{-2}$ was obtained.

The same tests as in Example 1 were carried out.
The results are shown in Table 1.

TABLE 1

|  | Ex. 1 | Ex. 2 | Ex. 3 | Ex. 4 | Ex. 5 |
| --- | --- | --- | --- | --- | --- |
| Tape thickness (mm) | 0.250 | 0.205 | 0.295 | 0.260 | 0.180 |
| Peeling adhesion to glass (gf/25 mm)[1] | 1100 | 680 | 860 | 580 | 550 |
| Peeling adhesion to iron (gf/25 mm)[2] | 420 | 690 | 400 | 400 | 300 |
| Shear adhesion (kgf/cm²)[3] | 15.5 | 9.7 | 13.3 | 18.7 | 25.3 |
| Electric resistance between[4] surfaces (mΩ/layer) | 9.6 | 12.5 | 23.8 | 5.4 | 7.5 |
| Taper block test (sec)[5] | 35.8 | 25.4 | 46.5 | 65.2 | 16.3 |
| Load sliding test (mm)[6] | up to 1 | up to 1 | up to 1 | up to 1 | 2.0 |
| 5 feet pound test[7] | 2 | 5 | 1 | 3 | 3 |
| Electric resistance between[8] glass and band (mΩ): | | | | | |
| before clamping | $5.7 \times 10^{14}$ | $6.5 \times 10^{15}$ | $2.3 \times 10^{13}$ | $4.4 \times 10^{14}$ | $3.6 \times 10^{9}$ |
| after clamping: | | | | | |
| average at four corners | 1.56 | 2.70 | 0.30 | 3.50 | 0.86 |
| average at flat sides | 16.5 | 45.0 | 10.4 | 19.8 | 6.9 |

In Table 1, the characteristics were measured by the following method.

1) Peeling adhesion to glass:
   180° peeling off test at 300 mm/min at 30° C.
2) Peeling adhesion to iron:
   180° peeling off test at 300 mm/min at 30° C. after sample was pressed at 300° C. for 10 seconds.
3) Shear adhesion:
   The shearing force at 50 mm/min at 23° C., after the tape was sandwiched between stainless steel (SUS) plates and pressed at 300° C. for 10 seconds.
4) Electric resistance between the two major surfaces of the tape:
   Copper foils were applied on both surfaces of the tape, which was fixed on the surface of an iron column having a diameter of 50 mm. The tape was faced down and pressed at a pressure of 5 kg/cm² and at 300° C., and during the pressing, an electric resistance between the copper foils was determined.
5) Taper block test:
   Two taper iron blocks composing an iron column having a size of 25 mm×25 mm and a height of 70 mm are separated at the middle of the column by a sliding angle of 5°, and an adhesive tape having a size of 25 mm×25 mm was adhered between the two taper blocks to form a column. The upper block was heated to 300° C. and a load of 10 kg was applied thereto. In this state, the time until the upper block fell down by slipping from the adhesive tape was determined.
6) Load sliding test:
   A load of 120 kg was applied to a CRT with an adhesive tape clamped with a clamping band at 70° C. for 30 minutes, and the maximum amount of sliding determined.
7) 5 feet pound test:
   A CRT was positioned with the front side thereof facing upward, and a steel ball having a weight of 500 g was dropped thereon from a height of 1.5 m. The number of cracks passing through the portion under the clamping band was determined.

8) Electric resistance between glass and band:

Copper foils were adhered at the four corners and at the middle of the four sides of the CRT before a clamping band was applied. After the adhesive tapes were applied, other copper foils were applied to the adhesive tapes at the portions just above the previously applied copper foils, and then clamping was effected. The electric resistance between the corresponding two copper foils were then determined.

I claim:

1. An adhesive tape for preventing an implosion of a cathode ray tube, comprising:
   a flexible substrate in the form of a fabric having first and second main sides;
   a first adhesive layer of a pressure-sensitive adhesive coated on the first main side of the flexible substrate;
   a second adhesive layer of a thermoplastic resin type adhesive coated on the second main side of the flexible substrate; and
   electrically conductive particles dispersed in one of the first and second adhesive layers, the electrically conductive particles having a particle size of from 0.1 µm to 300 µm and a mode particles size of from 25 µm to 300 µm, the electrically conductive particles being contained in a reduced dispersion amount of 1 to $10^5$ cm$^{-2}$, the reduced dispersion amount being represented by the following formula:

$$D_r = \frac{W}{V_m \cdot \rho \cdot 10^4}$$

where $D_r$ stands for the reduced dispersion amount (cm$^{-2}$), W stands for a weight of electrically conductive particles used per unit area (g/m$^2$), $V_m$ stands for a volume of an electrically conductive particle at the mode (cm$^3$), and $\rho$ stands for a density of the electrically conductive particles (g/cm$^3$), wherein the other one of the first and second adhesive layers is devoid of electrically conductive particles and is an electrically insulative layer having an electric resistance of more than $10^9$ Ω-cm, and wherein the adhesive tape has an electrical resistance before use between the two major surfaces thereof of more than $10^3$ MΩ.

2. A tape according to claim 1, wherein the electrically conductive particles are selected from the group consisting of particles of iron, copper, aluminum, nickel, and an alloy thereof.

3. A tape according to claim 1, wherein the fabric is selected from the group consisting of glass cloth, a synthetic resin fabric, and a cotton fabric.

4. A tape according to claim 1, wherein the tape has an electrical resistance of less than 10 Ω between the two major surfaces thereof when compressed at a pressure of 10 to 30 kgf/cm$^2$ and at a temperature of not less than 120° C.

5. A tape according to claim 1, wherein the second adhesive layer is the electrically insulative layer and the electrically conductive particles are dispersed in the first adhesive layer.

6. A tape according to claim 1, wherein the second adhesive layer of the thermoplastic resin type adhesive is selected from the group consisting of polyethylene and ethylenevinyl acetate copolymer.

7. An adhesive tape for preventing an implosion of a cathode ray tube, comprising,
   a flexible substrate in the form of an insulating solid film having a resistance of more than $10^9$ Ω-cm, the flexible substrate having first and second main surfaces;
   a first adhesive layer coated on the first main surface of the flexible substrate, said first adhesive layer being in contact with the flexible substrate before use of the adhesive tape;
   a second adhesive layer coated on the second main surface of the flexible substrate, said second adhesive layer being in contact with the flexible substrate before use of the adhesive tape; and
   electrically conductive particles dispersed in an amount of the first and second adhesive layers, the electrically conductive particles having a particle size of from 0.1 µm to 300 µm and a mode particle size of from 25 µm to 300 µm, the electrically conductive particles being contained in a reduced dispersion amount of 1 to $10^5$ cm$^{-2}$, the reduced dispersion amount being represented by the following formula:

$$D_r = \frac{W}{V_m \cdot \rho \cdot 10^4}$$

where $D_r$ stands for the reduced dispersion amount (cm$^{-2}$), W stands for a weight of electrically conductive particles per unit area (g/m$^2$), $V_m$ stands for a volume of an electrically conductive particle at the mode (cm$^3$), and $\rho$ stands for a density of the electrically conductive particles (g/cm$^3$), wherein the adhesive tape has an electrical resistance before use between the two major surfaces thereof of more than $10^3$ MΩ.

8. A tape according to claim 7, wherein the insulating solid film is polyester.

9. A tape according to claim 7, wherein the electrically conductive particles are selected from the group consisting of iron, copper, aluminum, nickel, and an alloy thereof.

10. A tape according to claim 7, wherein the tape has an electrical resistance of less than 10 Ω between the two major surfaces thereof when compressed at a pressure of 10 to 30 kgf/cm$^2$ and at a temperature of not less than 120° C.

11. An adhesive tape for preventing an implosion of a cathode ray tube, comprising:
   a flexible substrate in the form of a fabric having first and second main sides;
   a first adhesive layer coated on the first main side of the flexible substrate;
   a second adhesive layer coated on the second main side of the flexible substrate; and
   electrically conductive particles dispersed in one of the first and second adhesive layers, the electrically conductive particles having a particle size of from 0.1 µm to 300 µm and a mode particle size of from 25 µm to 300 µ, the electrically conductive particles being contained in a reduced dispersion amount of 1 to $10^5$ cm$^{-2}$, the reduced dispersion amount being represented by the following formula:

$$D_r = \frac{W}{V_m \cdot \rho \cdot 10^4}$$

where $D_r$ stands for the reduced dispersion amount (cm$^{-2}$), W stands for a weight of electrically conductive particles used per unit area (g/m$^2$), $V_m$ stands for a volume of an electrically conductive particle at the mode (cm$^3$), and $\rho$ stands for a density of the electrically conductive particles (g/cm$^3$), wherein the other one of the first and second adhesive layers is devoid of electrically conductive particles and is an electrically insulative layer having an electric resistance of more than 10$^9$ Ω-cm, and wherein the adhesive tape has an electrical resistance before use between the two major surfaces thereof of more than 10$^3$ MΩ.

12. An adhesive tape for preventing an implosion of a cathode ray tube, comprising,
- a flexible substrate in the form of an insulating solid film having a resistance of more than 10$^9$ Ω-cm, the flexible substrate having first and second main surfaces;
- a first adhesive layer of a pressure-sensitive adhesive coated on the first main side of the flexible substrate, said first adhesive layer being in contact with the flexible layer before use of the adhesive tape;
- a second adhesive layer of a thermoplastic resin type adhesive coated on the second main side of the flexible substrate, said second adhesive layer being in contact with the flexible substrate before use of the adhesive tape; and
- electrically conductive particles dispersed in at least one of the first and second adhesive layers, the electrically conductive particles having a particle size of from 0.1 μm to 300 μm and a mode particle size of from 25 μm to 300 μm, the electrically conductive particles being contained in a reduced dispersion amount of 1 to 10$^5$ cm$^{-2}$, the reduced dispersion amount being represented by the following formula:

$$D_r = \frac{W}{V_m \cdot \rho \cdot 10^4}$$

where $D_r$ stands for the reduced dispersion amount (cm$^{-2}$), W stands for a weight of electrically conductive particles used per unit area (g/m$^2$), $V_m$ stands for a volume of an electrically conductive particle at the mode (cm$^3$), and $\rho$ stands for a density of the electrically conductive particles (g/cm$^3$), wherein the adhesive tape has an electrical resistance before use between the two major surfaces thereof of more than 10$^3$ MΩ.

* * * * *